United States Patent

[11] 3,580,636

| [72] | Inventor | Joseph B. Setto |
| | | Los Angeles, Calif. |
| [21] | Appl. No. | 2,708 |
| [22] | Filed | Jan. 14, 1970 |
| [45] | Patented | May 25, 1971 |
| [73] | Assignee | The United States of America as represented by the Secretary of the Air Force |

[54] DUAL SIDE ARM CONTROLLER
9 Claims, 6 Drawing Figs.
[52] U.S. Cl. .................................................. 297/417, 244/83
[51] Int. Cl. ...................................................... A47c 7/54, B64c 13/04
[50] Field of Search ........................................... 244/83, 84; 297/411, 414, 417, 429; 74/471, 515

[56] References Cited
UNITED STATES PATENTS

| 2,618,447 | 11/1952 | Lecarme | 244/83 |
| 3,116,093 | 12/1963 | Bosack | 297/417 |
| 3,374,032 | 3/1968 | Del Giudice | 297/417X |
| 3,468,582 | 9/1969 | Judd | 297/417X |

*Primary Examiner*—Casmir A. Nunberg
*Attorneys*—Harry A. Herbert, Jr. and Jacob N. Erlich ABSTRACT: A dual side arm controller for use within the armrests of a seat. The seat is made up of a back portion and a pair of retractable armrests. The side arm controller is made up of a handgrip, cables and torque tube. The relationship between these elements allow for the retractable movement of either of the armrests without substantially affecting the operation of the side arm controllers.

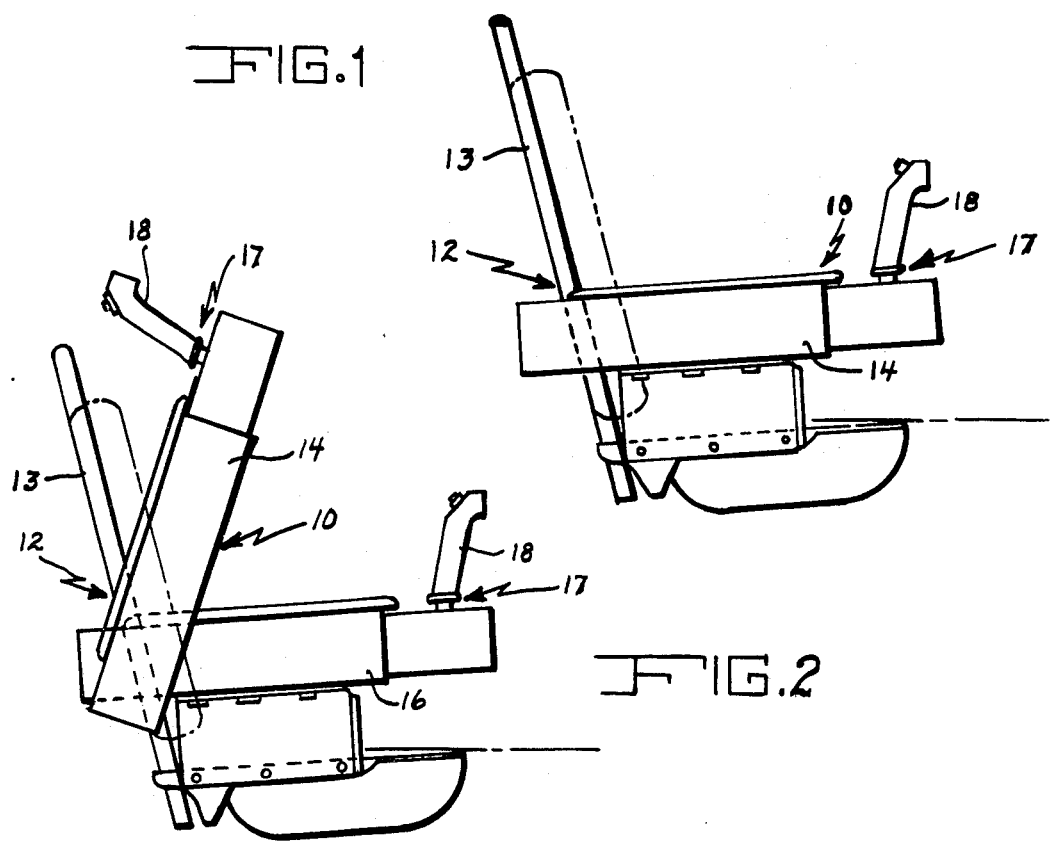
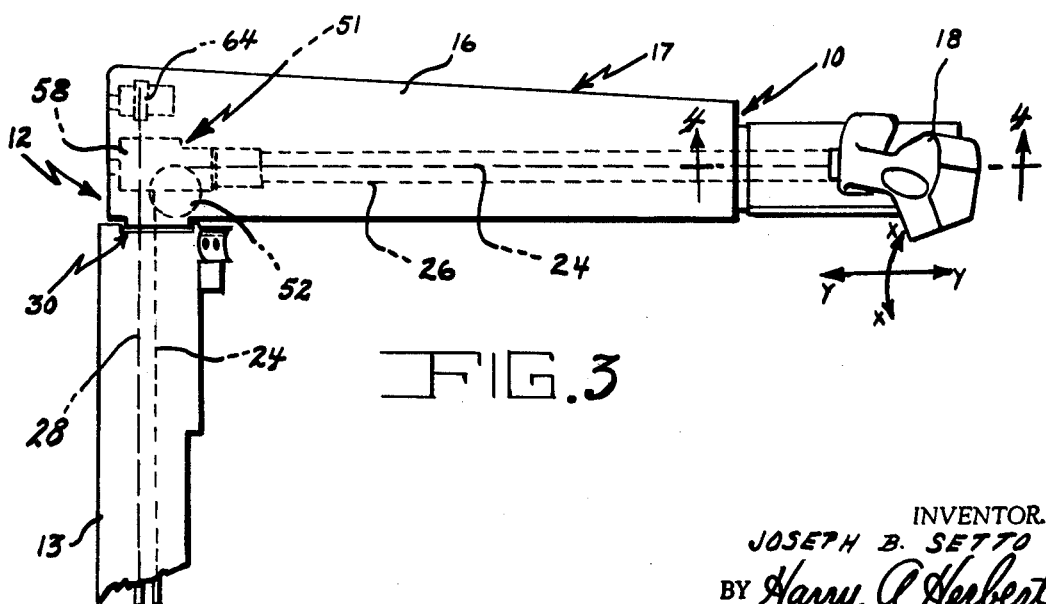

INVENTOR.
JOSEPH B. SETTO
BY Harry A. Herbert Jr
Jacob N. Erlich and
ATTORNEYS

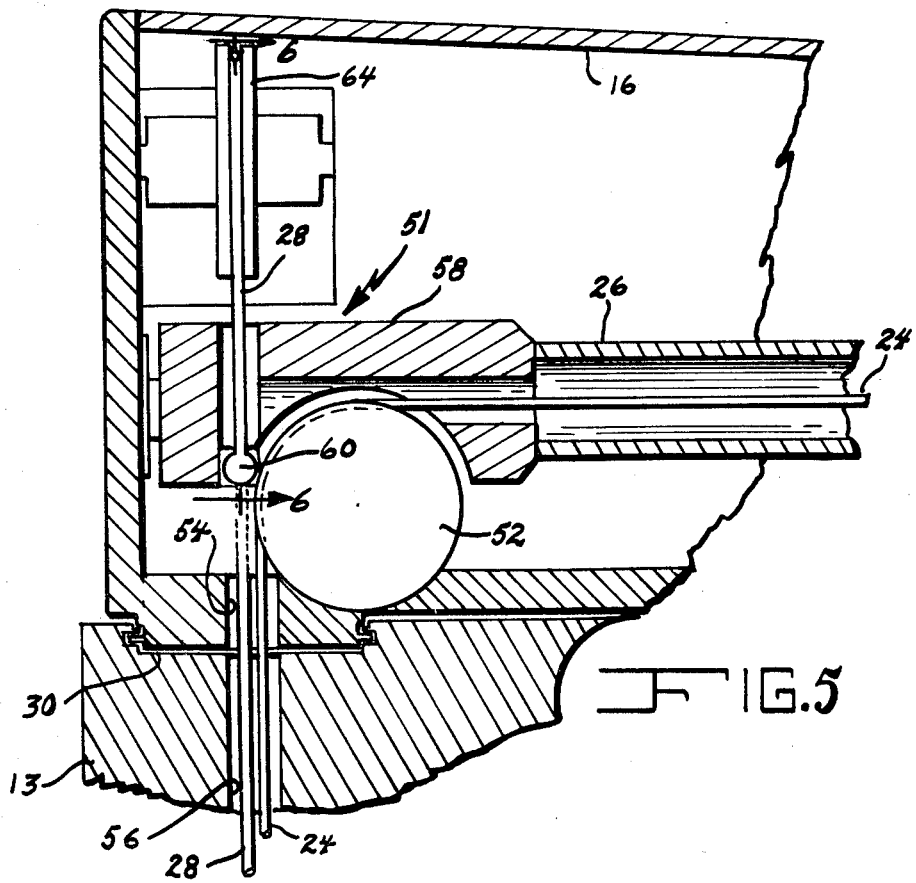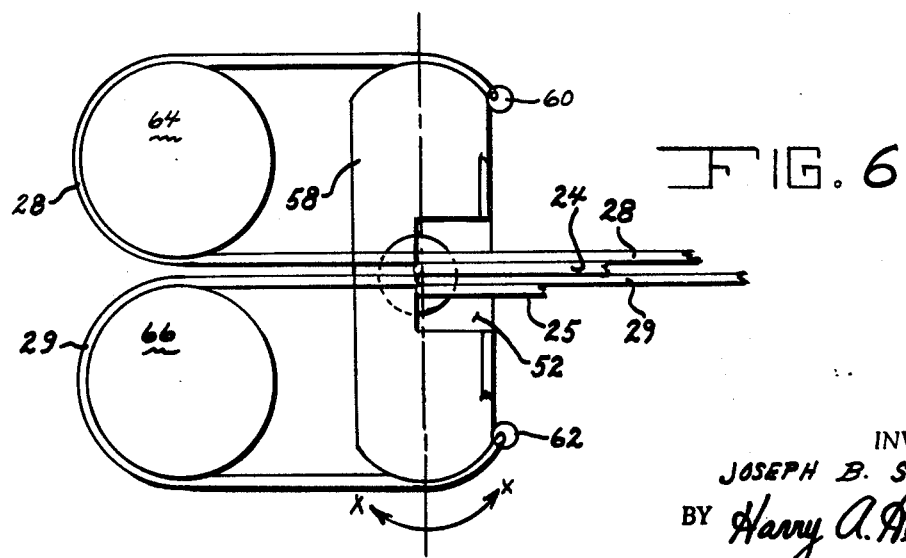

DUAL SIDE ARM CONTROLLER

BACKGROUND OF THE INVENTION

For many years the design of the instrument panel and the seating arrangement on conventional aircraft was conducted on a casual basis, with the instruments grouped by function or system, or perhaps on the basis of availability of space on and behind the panel, or on other mechanical requirements. However, with the continuing increase in the complexity of the aircraft, the panel and seating arrangement became more and more of a complex problem, and although many attempts were made to alleviate the complexity of the problems involved, practically, nothing seemed to be accomplished. As discussed above, it is essential that the pilot must have his instruments at a convenient location with relation to his seat and at the same time he must be able to control the aircraft in accordance with the readings of the instruments. Such a seating and panel arrangement could be accomplished if space were not essential, however, in the modern jet aircraft space is at a minimum. It is therefore necessary to position a pilots seat as close as possible to the most pertinent instruments and simultaneously to the controlling means.

For a large jet aircraft, the most efficient manner in which to control the aircraft has been to mount the aircraft controls in one of or both the armrests of the pilot's seat. Such a controller is conventionally called a side arm controller. With above system, the seat can be located proximate the instruments and yet provide easy accessibility for the pilot to the controls. In the large jet aircrafts, however, where space limitations are extremely critical, the only entrance to the pilot's or copilot's seat is through a center aisle adjacent the seat. Due to the complexity of the linkage arrangement of a side arm control it was virtually impossible to retractably mount the side arm control in the armrest. It therefore became extremely difficult for the pilot to enter his seat.

It is therefore necessary to devise a system in which the most convenient controlling means for the aircraft, that is the side arm controller, could be retractably positioned within an aircraft where space requirements are at a minimum. It is most desirable to construct a seat for the pilot in which a pair of such side arm controls are utilized and in which either arm is capable of being swung out of the way when not in use. In this manner, the pilot could easily enter his seat or perform other duties when the side arm controller is in the inoperative position and yet when necessary the side arm controller could be readily positioned for operation. The major problem heretofore involved in a retractable side arm controller mechanism was that in positioning the side arm controller in its inoperative position the linkages would change length thereby only further complicating the problem of construction.

In other words, in order to construct a side arm controller which was retractable, very complex linkage mechanisms had to be utilized, with the resultant failures being extremely high. In aircraft such failures usually produce disastrous results.

Furthermore, it would be best if a dual side arm controller could be utilized, such that the pilot could control the aircraft with either hand or in order to give the pilot an auxiliary control. Such a dual side arm controller, however, if retractable in nature, would double the difficulty of construction of the single side arm controller.

SUMMARY OF THE INVENTION

The instant invention overcomes the problems heretofore encountered and as set forth hereinabove.

The dual side arm controller of this invention is utilized in conjunction with a pilot's seat and is capable of retractable movement without the difficulty encountered heretofore of changing the linkage lengths of the controller. This invention is capable of movement of a side arm controller to the inoperative position with a minimum of complexity in construction and which maintains high standards of performance.

Each arm of the dual side arm controller of this invention is identical in construction and contains a control grip therein which is located at one end of the arm. The dual side arm controller of this invention is formed in the armrests of a seat. Both grips of the dual side arm controller of this invention are slaved together so that the operator or pilot can control the output of the controller with either hand. Since both armrests or side arms of this invention are identical in construction the discussion set forth hereinbelow will be limited to only one of such side arms.

The dual side arm controller of this invention performs two functions, (1) a forward and aft motion hereafter called a $y$ output and (2) a side motion hereafter called the $x$ output. The handgrip when moved in a direction parallel to the length of the side arms and pivoted about a point perpendicular thereto represents the forward and aft motion output, while the side motion output is represented by the handgrips movement about a pivot point along the length of the side arms. Each of the side arms of the dual side arm controller of this invention is capable of retracted motion, that is capable of being moved to a position 90° away from the initial position. The instant invention allows for each of the side arms or armrests to be so retracted without altering the linkage lengths or destroying the function of the handgrips in controlling the aircraft. This is accomplished by the relationship maintained between a torque tube and a pulley arrangement which transmits the side motion $x$ output and a pulley arrangement which transmits the forward and aft $y$ motion output. Raising either one of the side arms does not affect the action of the handgrip attached thereto and therefore the accuracy, reliability and efficiency in controlling the aircraft are also not adversely affected. The particular routing and mechanical linkage system utilized in this invention allows for the retractability of the side arm so that a pilot can have accessibility to the center console or to his seat and also gives him the redundancy of a dual controller. In other words the pilot may maintain control of the aircraft with either side arm handgrip whether or not one of the two is in the inoperative or retracted position.

It is therefore an object of this invention to provide a dual side arm controller which allows for the retractability of either side arm without altering the linkage lengths of the handgrip associated therewith.

It is another object of this invention to provide a dual side arm controller which allows for the control of an aircraft with either one of the side arms, independently of the other.

It is a further object of this invention to provide a dual side arm controller which is economical to produce and which utilizes conventional, currently available components that lend themselves to standard mass-producing manufacturing techniques.

For a better understanding of the present invention, together with other and further objects thereof, reference is made to the following description taken in connection with the accompanying drawing and its scope will be pointed out in the appended claims.

DESCRIPTION OF THE DRAWING

FIG. 1 is a side elevational view of the dual side arm controller of this invention in association with the arm rests of a seat and having both arms in the "down" or operative position;

FIG. 2 is a side elevational view of the dual side arm controller of this invention in association with the armrests of a seat and having one of the arms in the retracted or inoperative position;

FIG. 3 is a top view of one of the arms of the dual side arm controller of this invention;

FIG. 5 is an enlarged top view showing in detail portion of one of the arms of the dual side arm controller of this invention shown partly in cross section; and FIG. 6 is an enlarged cross-sectional view taken along line 6–6 of FIG. 5.

DESCRIPTION OF THE PREFERRED EMBODIMENT

Figure 4:
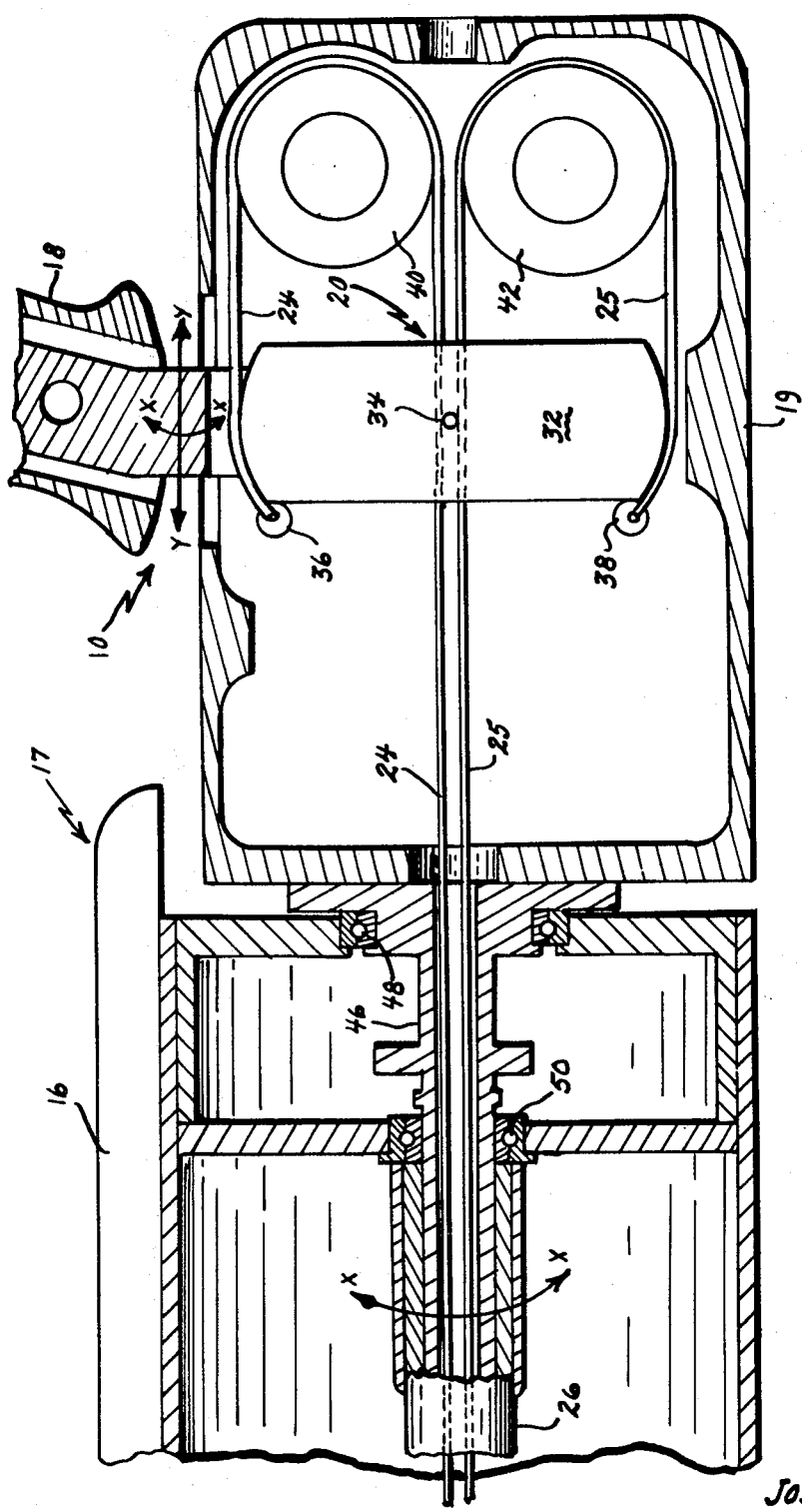
FIG. 4 is an enlarged view taken along line 4–4 of FIG. 3 and shown partly in cross section.

Reference is now made to FIGS. 1 and 2 of the drawing which show the dual side arm controller 10 of this invention utilized in conjunction with a seat 12. The seat 12 is of a conventional construction and includes a back portion 13 and a pair of armrests 14 and 16. Each of the armrests 14 and 16 contain one of dual side arm controls 17 of this invention. In FIG. 1 both armrests 14 and 16 are in the down or operative position. In FIG. 2 the armrest 14 is in the retracted or inoperative position, while the armrest 16 remains in the down or operative position. It should be realized, however, although not shown, the position of the arms may be reversed.

Each of the armrests 14 and 16 contain similar side arm control mechanisms 17 which are made up of a control grip 18 located at the end of each of the armrests 14 and 16, respectively. Both of these grips 18 are slaved together (not shown) such that the operator of the aircraft can control the performance thereof with either hand. Since the accessibility to the seat 12 may be difficult either one of the armrests 14 or 16 is capable of retractable motion as shown in FIG. 2 and as explained hereinabove. The detailed description of the dual side arm controller 10 of this invention will be explained hereinbelow with reference to FIGS. 3—6. Since both the left and right control mechanisms 17 of the dual side arm controller 10 of this invention are identical in construction, the description which is set forth hereinbelow will refer to only one such side arm control mechanism will utilize like numerals for identification.

A top view of one side arm control mechanisms 17 of the dual side arm controller 10 is best shown in FIG. 3. The handgrip 18 located at one end thereof performs two functions, a forward and aft motion, described hereafter as the y output and a side motion hereafter called an x output. Shown without detail in FIG. 3, cables 24 and 25 (only cable 24 can be seen in FIG. 3) are secured in a manner set forth hereinbelow to the handgrip 18 so that the motion of handgrip 18 in the y direction causes the cables 24 and 25 to respond in a like manner. Movement of the handgrip 18 in the x direction causes the rotation of a torque tube 26 which transmits its rotary motion to a pair of cables 28 and 29 (only cable 28 can be seen in FIG. 3) The cables 24, 25 and 28, 29 are linked together with cables 24, 25 and 28, 29 respectively from the other arm 14 of the dual side arm controller 10 of this invention and are then utilized in a conventional manner in controlling the aircraft in an operation not forming part of this invention. The unique relationship between the handgrip 18, the armrests 14 and 16 and the cables 24, 25, 28 and 29 permit the retractable or rotary motion of the armrests 14 or 16 about pivot area 30. The armrests 14 and 16 are pivotally secured to the back portion 13 of seat 12 in any conventional manner as best shown in FIG. 5. The rotary or retractable motion of the armrests 14 or 16 of this invention is thereby performed with a minimum of complex linkages.

Referring now to FIG. 4, an outer housing 19 encases the mechanism 20 associated with handgrip 18. The handgrip 18 is fixedly secured in any suitable manner to a pivot plate 32, the pivot plate 32 being pivotably mounted about pin 34 within housing 19. The top cable 24 is fixedly secured to the top end of pivot plate 32 by any conventional securing means 36. The bottom cable 25 is fixedly secured to the bottom of pivot plate 32 by any conventional securing means 38. The cables 24 and 25 are wound about pulleys 40 and 42, respectively, and then proceed toward the back portion of armrest 16 through torque tube 26. It is therefore clearly shown that when the handgrip 18 is moved in the y direction the cables 24 and 25 will move accordingly to control the aircraft in a conventional manner.

The outer housing 19 of armrest 16 is fixedly secured to an inner tubelike member 46. This tubelike member 46 is in turn rotatably mounted within the armrest 16 by any suitable securing means such as bearing members 48 and 50. The tubelike member 46 is further fixedly secured in any conventional manner to a torque tube 26 which is capable of rotation therewith. The cables 24 and 25 are located within torque tube 26. Therefore, any movement of handgrip 18 along with housing 19 in the x direction simultaneously rotates the tubelike member 46 and torque tube 26 in the x direction. This rotating movement will be transmitted to cables 28 and 29 in a manner set forth hereinbelow and shown clearly in FIGS. 5 and 6.

Referring now to FIG. 5 of the drawing, the end portion 51 of the armrest 16 is clearly shown. As seen in FIG. 5 the cables 24 and 28 are shown while cables 25 and 29 are directly therebeneath and not shown in the FIG. Cables 24 and 25 encircle pulley 52 (see FIGS. 5 and 6) and exit through an aperture 54 along the center of rotation within armrest 16 before entering opening 56 within the back portion 13 of the seat 12. The encirclement of pulley 52 by cables 24 and 25 is clearly shown in FIG. 6.

Referring once again to FIG. 5 the torque tube 26 is fixedly secured to an end pivot plate 58. The top cable 28 is fixedly secured to the top of pivot plate 58 by any conventional securing means at 60. The bottom cable 29 is fixedly secured to the bottom of pivot plate 58 by any conventional securing means at 62. Both cables 28 and 29 are best shown in FIG. 6.

Referring to FIGS. 5 and 6 the cable 28 proceeds to encircle pulley 64 while cable 29 encircles pulley 66. These cables then proceed to exit through aperture 54 and enter opening 56 along with cables 24 and 25 along the centerline of rotation of the armrest 16. The cables as explained hereinabove are slaved together within back portion 13 with another set of cables 24, 25, 28 and 29 from the other side arm control mechanism 17 of the dual side arm controller 10 of this invention. These cables 24, 25, 28 and 29 are then utilized to control the aircraft in a conventional manner.

Because of the unique relationship between the cables 24 and 25 and the torque tube 26 and cables 28 and 29 the armrests 14 and 16 are capable of retractable motion about pivot area 30. The linkage arrangement of this invention is relatively simple and there is no change in length of the linkages involved. The armrests 14 and 16 of the dual side arm controller 10 of this invention are therefore completely retractable.

Although the invention has been described with reference to a particular embodiment, it will be understood to those skilled in the art that the invention is capable of a variety of alternative embodiments within the spirit and scope of the appended claims.

I claim:

1. In a seat having a back portion, the improvement therein being a dual side arm controller, said side arm controller comprising at least one retractable armrest pivotally secured at one end to one side of said back portion, a housing rotatably mounted at the other end of said armrest, a handgrip pivotally secured to said housing, a cable fixedly secured to said handgrip for movement therewith, and a torque tube fixedly secured at one end to said housing for rotation therewith, whereby the relative positions of said cable and said torque tube remain unchanged during retracting of said armrest.

2. In a seat as defined in claim 1 wherein said side arm controller further comprises a pivot plate being pivotally secured substantially at its center to said housing, said handgrip being fixed secured to said pivot plate, said cable being fixedly secured to one end of said pivot plate, a second cable being fixedly secured to the other end of said pivot plate, and said torque tube encompassing said pair of cables.

3. In a seat as defined in claim 2 wherein said side arm controller further comprises a hollow pivot plate being fixedly secured substantially at its center to the other end of said torque tube, a third cable being fixedly secured to one end of said hollow pivot plate and a fourth cable being fixedly secured to the other end of said pivot plate.

4. In a seat as defined in claim 3 wherein said side arm controller further comprises a first pulley rotatably mounted within said housing adjacent said first cable and a second pulley being rotatably mounted within said housing adjacent said second cable whereby said first cable encircles said first pulley and said second cable encircles said second pulley before being encompassed by said torque tube.

5. In a seat as defined in claim 4 wherein said side arm controller further comprises a third pulley rotatably mounted within said armrest having its center of rotation perpendicular to the center of rotation of said first and second pulleys whereby said first and second cables encircle said third pulley after exiting from said torque tube.

6. In a seat as defined in claim 5 wherein said side arm controller further comprises a fourth pulley rotatably mounted within said armrest adjacent said third cable and a fifth pulley rotatably mounted within said armrest adjacent said fourth cable whereby said third cable encircles said fourth pulley and said fourth cable encircles said fifth pulley.

7. In a seat as defined in claim 6 wherein said side arm controller further comprises an aperture within said armrest substantially at its pivotal connection with said back portion and an opening in said back portion substantially adjacent to said aperture whereby said first, second, third and fourth cables protrude through said aperture and into said opening.

8. In a seat as defined in claim 7 wherein said side arm controller further comprises a second retractable armrest pivotally secured at one end to the other side of said back portion.

9. In a seat as defined in claim 8 wherein said other armrest has a housing rotatably mounted at the other end thereof, a handgrip pivotally secured to said housing, a cable fixedly secured to said handgrip and a torque tube fixedly secured to said housing.